(12) United States Patent
Matwey et al.

(10) Patent No.: US 8,920,128 B2
(45) Date of Patent: Dec. 30, 2014

(54) GAS TURBINE ENGINE COOLING SYSTEMS HAVING HUB-BLEED IMPELLERS AND METHODS FOR THE PRODUCTION THEREOF

(75) Inventors: Mark Matwey, Phoenix, AZ (US); David K. Jan, Fountain Hills, AZ (US); Srinivas Jaya Chunduru, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 547 days.

(21) Appl. No.: 13/277,034

(22) Filed: Oct. 19, 2011

(65) Prior Publication Data
US 2013/0098061 A1  Apr. 25, 2013

(51) Int. Cl.
| | | |
|---|---|---|
| F02C 6/04 | (2006.01) | |
| B63H 1/28 | (2006.01) | |
| B63H 1/16 | (2006.01) | |
| F01D 5/04 | (2006.01) | |
| F01D 5/08 | (2006.01) | |

(52) U.S. Cl.
CPC ............... *F01D 5/046* (2013.01); *F01D 5/085* (2013.01)
USPC .......................... 416/231 R; 416/181; 60/785

(58) Field of Classification Search
CPC ........... F02C 6/04; F01D 11/24; B64C 11/08; F04D 29/38
USPC ................. 416/231 R, 181; 60/782, 785, 795
See application file for complete search history.

(56) References Cited

U.S. PATENT DOCUMENTS

| | | |
|---|---|---|
| 2,715,011 A | 8/1955 | Schorner |
| 2,873,945 A | 2/1959 | Kuhn |
| 3,065,954 A | 11/1962 | Whitaker |
| 3,582,232 A | 6/1971 | Okapuu |
| 3,628,890 A | 12/1971 | Sayre et al. |
| 4,053,261 A | 10/1977 | Pennig |
| 4,142,836 A | 3/1979 | Glenn |

(Continued)

FOREIGN PATENT DOCUMENTS

FR     2944060     * 10/2010

OTHER PUBLICATIONS

Daniel Hanus, et al.; First Stage of the Centrifugal Compressor Design with Tandem Rotor Blades; Czech Technical University in Prague.

(Continued)

*Primary Examiner* — Gerald L Sung
(74) *Attorney, Agent, or Firm* — Ingrassia Fisher & Lorenz, P.C.

(57) ABSTRACT

Embodiments of a gas turbine engine cooling system for deployment within a gas turbine engine are provided, as are embodiment of a method for producing a gas turbine engine cooling system. In one embodiment, the gas turbine engine cooling system includes an impeller having a hub, a plurality of hub bleed air passages, and a central bleed air conduit. The plurality of hub bleed air passages each have an inlet formed in an outer circumferential surface of the hub and an outlet formed in an inner circumferential surface of the hub. The central bleed air conduit is fluidly coupled to the outlets of the plurality of hub bleed air passages and is configured to conduct bleed air discharged by the plurality of hub bleed air passages to a section of the gas turbine engine downstream of the impeller to provide cooling air thereto.

17 Claims, 6 Drawing Sheets

(56) References Cited

U.S. PATENT DOCUMENTS

| | | | |
|---|---|---|---|
| 4,183,719 | A | 1/1980 | Bozung |
| 4,326,833 | A | 4/1982 | Zelahy et al. |
| 4,800,717 | A | 1/1989 | Rodgers |
| 5,725,355 | A | 3/1998 | Crall et al. |
| 6,035,627 | A | 3/2000 | Liu |
| 6,471,485 | B1 | 10/2002 | Rossmann et al. |
| 6,655,921 | B2 | 12/2003 | Kocian |
| 6,883,224 | B2 | 4/2005 | Thomas |
| 6,935,840 | B2 | 8/2005 | Romani et al. |
| 7,156,612 | B2 | 1/2007 | Warikoo et al. |
| 7,399,159 | B2 | 7/2008 | Matheny et al. |
| 7,559,745 | B2 | 7/2009 | Falk et al. |
| 7,624,581 | B2 | 12/2009 | Moniz |
| 7,841,834 | B1 | 11/2010 | Ryznic |
| 7,874,804 | B1 | 1/2011 | Brown |
| 2003/0185682 | A1 | 10/2003 | Lei et al. |
| 2007/0183896 | A1 | 8/2007 | Jay et al. |
| 2008/0112793 | A1 | 5/2008 | Lee et al. |
| 2009/0056125 | A1 | 3/2009 | Howe et al. |
| 2009/0162190 | A1 | 6/2009 | Romani et al. |
| 2010/0154433 | A1 | 6/2010 | Ottaviano et al. |
| 2010/0232953 | A1* | 9/2010 | Anderson et al. .......... 415/199.2 |
| 2010/0300113 | A1* | 12/2010 | Grewal et al. ................... 60/782 |
| 2012/0036865 | A1* | 2/2012 | Brillet et al. .................... 60/785 |

OTHER PUBLICATIONS

Roberts, Douglas, A., et al.; Numerical Investigation of Tandem-Impeller Designs for a Gas Turbine Compressor, Pratt & Whitney Canada, Mississauga, Ontario, Canada; vol. 124, Jan. 2002, Transactions of the ASME.

* cited by examiner

US 8,920,128 B2

GAS TURBINE ENGINE COOLING SYSTEMS HAVING HUB-BLEED IMPELLERS AND METHODS FOR THE PRODUCTION THEREOF

STATEMENT REGARDING FEDERALLY SPONSORED RESEARCH OR DEVELOPMENT

This invention was made with Government support under DTFAWA-10-C-00040 awarded by the FAA. The Government has certain rights in this invention.

TECHNICAL FIELD

The present invention relates generally to gas turbine engines and, more particularly, to embodiments of a gas turbine engine cooling system having a hub-bleed impeller, as well as to methods for producing such a gas turbine engine cooling system.

BACKGROUND

A gas turbine engine commonly includes an intake section, a compressor section, a combustor section, a turbine section, and an exhaust section. Due to the positioning of the turbine section immediately downstream of the combustor section, the air turbines and other turbine section components (e.g., turbine nozzles) are exposed to highly elevated temperatures during engine operation. Gas turbine engines are therefore often further equipped with a turbine cooling system to prevent overheating of the turbine section components by continually supplying cooling air thereto. The cooling air is bled from the gas turbine engine's compressor section and conducted through a network of cooling circuits, which directs the airflow over and around the combustion chamber before reintroducing the airflow into the turbine section. The turbine cooling system is typically passive in nature and relies upon the air pressure within the compressor section to drive airflow through the system's cooling circuits. In certain cases, the turbine cooling system may include a "Tangential On-Board Injection" or "TOBI" device, which injects the cooling airflow immediately upstream of the high pressure turbine while imparting the airflow with a tangential or swirling-type motion. In so doing, the TOBI device allows the bleed air to flow more easily into cooling channels provided in the rotating turbine thereby reducing parasitic pumping losses and providing lower cooling air temperatures and pressures to the turbine. The TOBI device thus serves as a means for producing a desired turbine cooling pressure and temperature that is lower than the maximum compressor exit condition.

To optimize the effectiveness of the turbine cooling system, the temperature of the air extracted from the compressor section is ideally as low as practical. At the same time, the pressure of the bleed air is preferably sufficiently high to create an adequate flow rate through the system's cooling circuits. Gas turbine engine platforms employing axial compressors typically have a relatively large number of compressor stages. As a result, it is typically relatively easy to select a compressor stage from which the turbine cooling system can bleed air that has a relatively low temperature while also having a sufficiently high pressure to satisfy the flow rate requirements of the cooling system. However, in the case of a gas turbine engine including a centrifugal compressor or impeller, it can be more difficult to extract air from the compressor section at a location that satisfies these competing criteria. When bled from a location near the inlet of the impeller, the temperature of the air is relatively low; however, so too is the air's pressure. Conversely, when bled from a location near the outlet of the impeller, the highly compressed airflow has a greatly elevated temperature and is generally undesirable for cooling purposes. The pressure level also tends to be much higher than necessary for adequate blade and disk cooling flow control and cooling passage pressurization. In addition, bleeding cooling air from the outlet of the impeller effectively wastes the energy expended to compress the airflow and consequently reduces the overall efficiency of the gas turbine engine.

It is thus desirable to provide embodiments of a gas turbine engine cooling system, such as a turbine cooling system, that enables the extraction of bleed air from an impeller at a location at which the temperature of the bleed air is relatively low, while the pressure of the bleed air is sufficiently high to satisfy the flow rate requirements of the cooling system. Ideally, embodiments of such a gas turbine engine cooling system would significantly reduce cooling circuit requirements, eliminate the need for a TOBI device, and decrease the overall part count, weight, and complexity of the cooling system as compared to a conventional turbine cooling system. It would also be desirable for embodiments of such a gas turbine engine cooling system to provide an improved impeller thermal stress gradient response and to improve overall system reliability by minimizing the amount of bleed air-entrained debris ingested by the cooling system. Finally, it would be desirable to provide embodiments of a method for producing such a gas turbine engine cooling system. Other desirable features and characteristics of the present invention will become apparent from the subsequent Detailed Description and the appended Claims, taken in conjunction with the accompanying Drawings and the foregoing Background.

BRIEF SUMMARY

Embodiments of a gas turbine engine cooling system are provided. In one embodiment, the gas turbine engine cooling system includes an impeller having a hub, a plurality of hub bleed air passages, and a central bleed air conduit. The plurality of hub bleed air passages each have an inlet formed in an outer circumferential surface of the hub and an outlet formed in an inner circumferential surface of the hub. The central bleed air conduit is fluidly coupled to the outlets of the plurality of hub bleed air passages and is configured to conduct bleed air discharged by the plurality of hub bleed air passages to a section of the gas turbine engine downstream of the impeller to provide cooling air thereto.

Embodiments of a method for producing a gas turbine engine cooling system are further provided. In one embodiment, the method includes the step of forming a plurality of hub bleed air passages in the intermediate portion of an impeller and extending from an outer circumferential surface of the impeller to an inner circumferential surface thereof.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
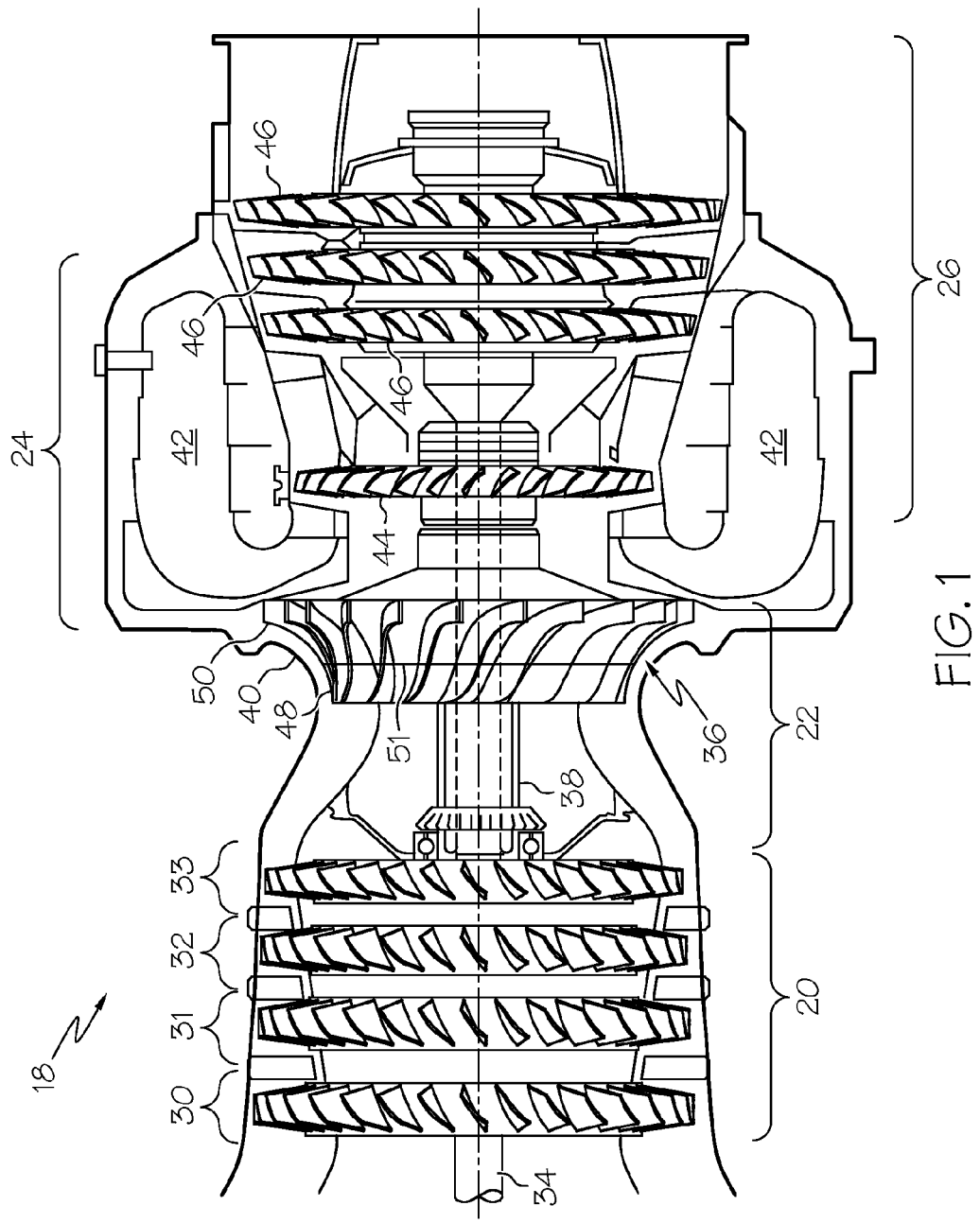
FIG. 1 is a schematic illustrating an exemplary gas turbine engine (partially shown) including a low pressure compressor section, a high pressure compressor section, a combustor section, and a turbine section.

FIG. 1 is a generalized schematic of a portion of a gas turbine engine (GTE) 18 including a low pressure compressor section 20, a high pressure compressor section 22, a combustor section 24, and a turbine section 26. In this particular example, low pressure compressor section 20 includes a plurality of axial compressor stages 30-33, which each include an axial compressor mounted to a low pressure (LP) spool or shaft 34. High pressure compressor section 22 is positioned immediately downstream of low pressure compressor section 20 and includes a single centrifugal compressor or impeller 36. Centrifugal impeller 36 is mounted to a high pressure (HP) shaft 38, which is co-axial with LP shaft 34 and through which LP shaft 34 extends. A shroud 40 encloses impeller 36 to guide airflow exhausted by impeller 36 into combustor section 24. Combustor section 24 includes at least one combustor 42 having an outlet nozzle, which directs combustive gas flow into turbine section 26. More specifically, the outlet nozzle of combustor 42 directs combustive gas flow from combustor section 24, through a high pressure turbine 44 mounted to HP shaft 38, and subsequently through a series of low pressure turbines 46 mounted to LP shaft 34. Although not illustrated in FIG. 1 for clarity, GTE 18 further includes additional sections, such as an intake section (e.g., a fan module) upstream of compressor section 20 and an exhaust section downstream of turbine section 26.

During GTE operation, the axial compressors within compressor stages 30-33 rotate in conjunction with LP shaft 34 to compress airflow received from the intake section of GTE 18. The compressed airflow is supplied to high pressure compressor section 22 and further compressed by impeller 36, which rotates in conjunction with HP shaft 38. The hot, compressed airflow is then directed into combustion chamber 42, mixed with fuel, and ignited. The air heats rapidly, expands, and flows from combustion chamber 42 and into the inlet of high pressure turbine 44. The combustive gas flow drives the rotation of turbine 44 and, therefore, the rotation of HP shaft 38 and impeller 36. After being exhausted from high pressure turbine 44, the combustive gases flow through low pressure turbines 46 to drive the rotation of turbines 46 and, therefore, the rotation of LP shaft 34 and the axial compressors within compressor stages 30-33. Finally, the air is expelled through the gas turbine engine's exhaust section to produce forward thrust. The power output of GTE 18 may be utilized in a variety of different manners, depending upon whether GTE 18 assumes the form of a turbofan, turboprop, turboshaft, or turbojet engine.

Impeller 36 is preferably, although not necessarily, produced from at least two discrete components or pieces. With reference to the exemplary embodiment illustrated in FIG. 1, specifically, impeller 36 is assembled from a forward inducer piece 48 and an aft exducer piece 50, which are joined along a split line 51. Relative to a unitary or monolithic-type construction (i.e., a one piece impeller), assembling impeller 36 from two discrete pieces facilitates the formation of bleed channels through inducer piece 48 and/or exducer piece 50 and, in certain embodiments, the installation of airflow guidance pieces (e.g., internal vortex spoiler tubes), as described more fully below. In addition, such a multi-piece construction enables different sections of impeller 36 to be fabricated from different materials tailored to the disparate operating conditions experienced by the aft and fore sections of impeller 36 during operation. The foregoing advantages notwithstanding, impeller 36 need not be produced from multiple pieces in all embodiments and may instead be produced as a single or monolithic piece via drilled holes or other machined passages if the stress level allows such features and meets life requirements.

Figure 2:
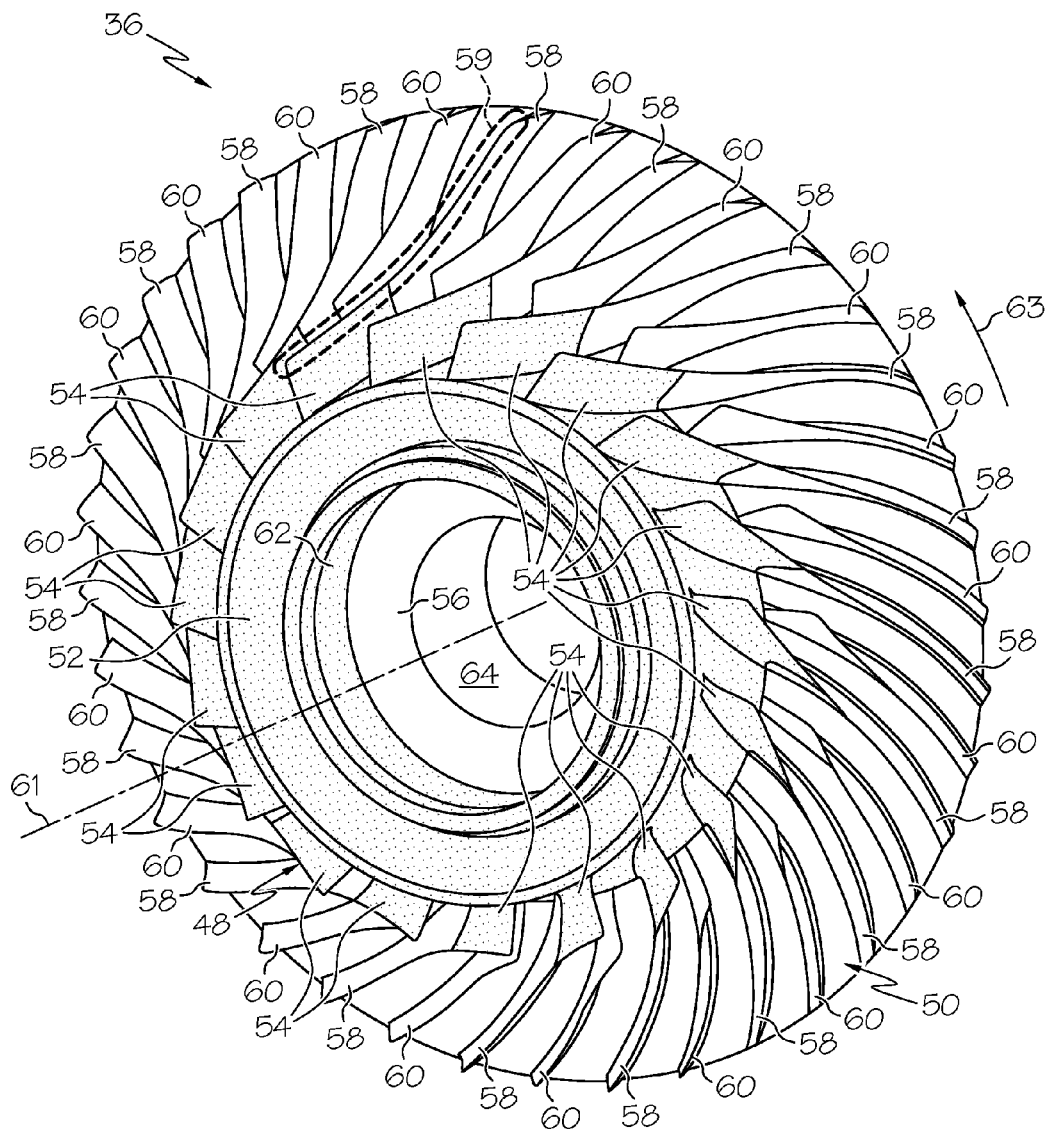
FIG. 2 is an isometric view of a multi-piece impeller included within the high pressure compressor section of the gas turbine engine shown in FIG. 1 and illustrated in accordance with an exemplary embodiment of the present invention.

FIG. 2 is an isometric view of multi-piece centrifugal impeller 36 illustrated in accordance with an exemplary embodiment of the present invention. As can be seen in FIG. 2, inducer piece 48 includes an inducer hub section 52 and a plurality of forward blade segments 54, which extend radially outward from inducer hub section 52 and which wrap or twist around the longitudinal axis of hub section 52 in a spiral pattern. Inducer hub section 52 and exducer hub section 56 assume the form of generally annular bodies having central openings 62 and 64 therein, respectively. In the illustrated example, the inner diameter of central opening 62 provided through inducer hub section 52 is greater than the inner diameter of central opening 64 provided through exducer hub section 56. When multi-piece centrifugal impeller 36 is assembled, inducer hub section 52 aligns axially with exducer hub section 56 and, preferably, radially pilots thereto. In this manner, hub sections 52 and 56 combine to form an impeller hub 52, 56 when impeller 36 is assembled. Central openings 62 and 64 likewise align when impeller 36 is assembled to define a central opening 62, 64 through impeller 36. When impeller 36 is installed within GTE 18 (FIG. 1), a spool (e.g., high pressure shaft 38 of GTE 18) extends through this longitudinal channel. Impeller 36, and specifically exducer hub section 56, is fixedly mounted to the gas turbine engine spool utilizing, for example, a curvic-type attachment. Although not shown in FIG. 2 for clarity, impeller 36 also includes a plurality of hub bleed air passages extending from the outer circumferential surface of impeller hub 52, 56 to the inner circumferential surface thereof, as will be described more fully below in conjunction with FIGS. 3-8.

Forward blade segments 54 are circumferentially spaced around inducer hub section 52 and extend from approximately the leading face of inducer hub section 52 to the trailing face thereof or, more generally, from approximately the leading circumferential edge of impeller 36 to a midsection thereof. Similarly, exducer piece 50 includes an exducer hub section 56 and a plurality of aft blade segments 58, which extend outward from exducer hub section 56 in a direction substantially normal to the hub surface and which wrap tangentially around hub section 56. In certain embodiments, exducer piece 50 may further include a plurality of truncated aft blades 60, commonly referred to as "splitter blades," which are circumferentially interspersed with aft blade segments 58 and which are similar thereto; e.g., as do aft blade segments 58, truncated aft blades 60 extend outward from exducer hub section 56 and wrap tangentially around hub section 56. Aft blade segments 58 and truncated aft blades 60 are likewise circumferentially spaced around inducer hub section 52 and extend from approximately the leading face of exducer hub section 56 to the trailing face thereof or, more generally, from approximately a mid-section of impeller 36 to the trailing circumferential edge thereof. Inducer piece 48 and exducer piece 50 are each preferably integrally formed as a single machined piece or bladed disc (commonly referred to as a "blisk").

Figure 3:
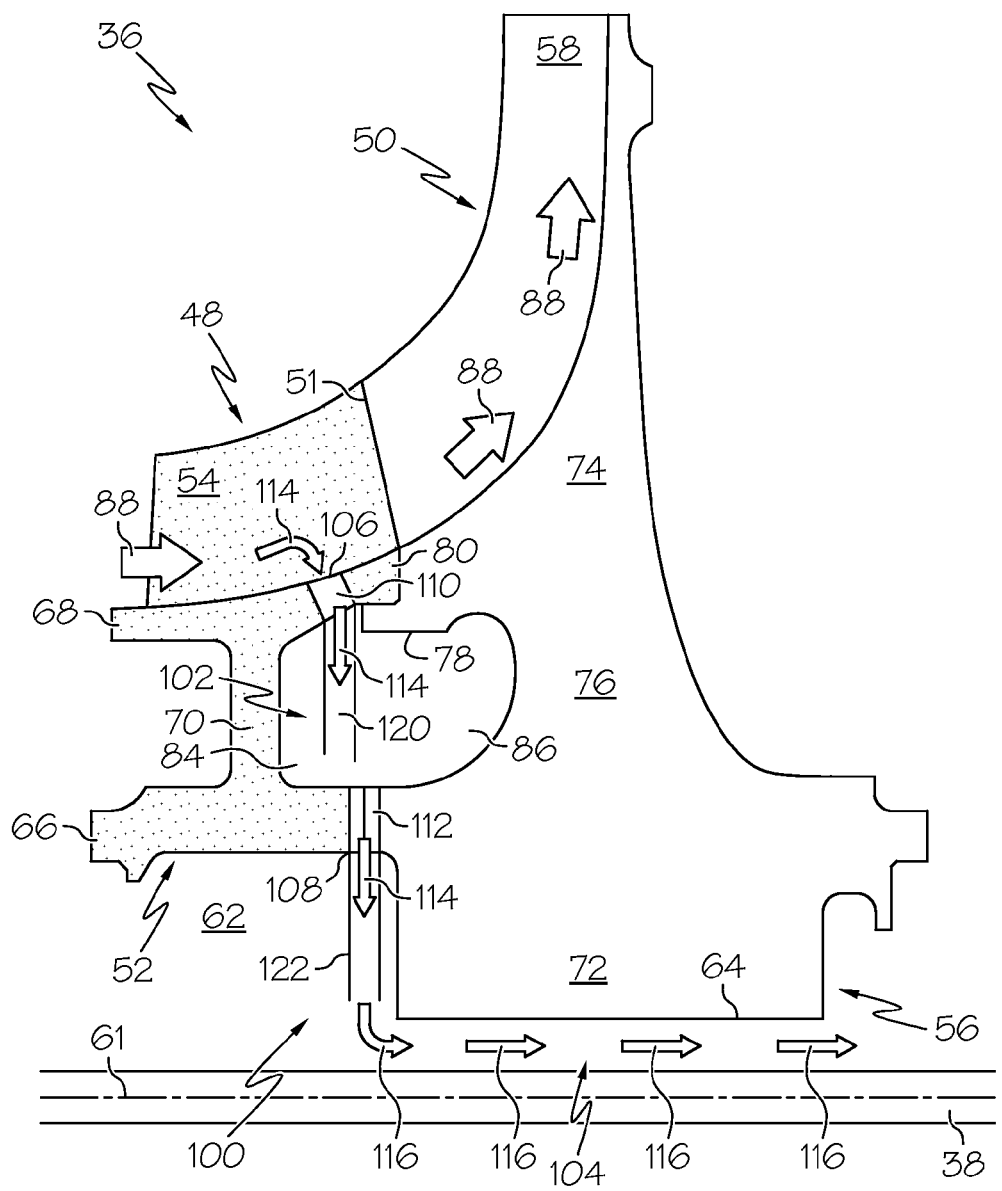
FIGS. 3 and 4 are side plan and isometric cross-sectional views, respectively, of a portion of the exemplary multi-piece centrifugal impeller shown in FIG. 2 illustrating one of a plurality of hub bleed air passage formed through the impeller hub and included within an exemplary gas turbine engine cooling system.
Figure 4:
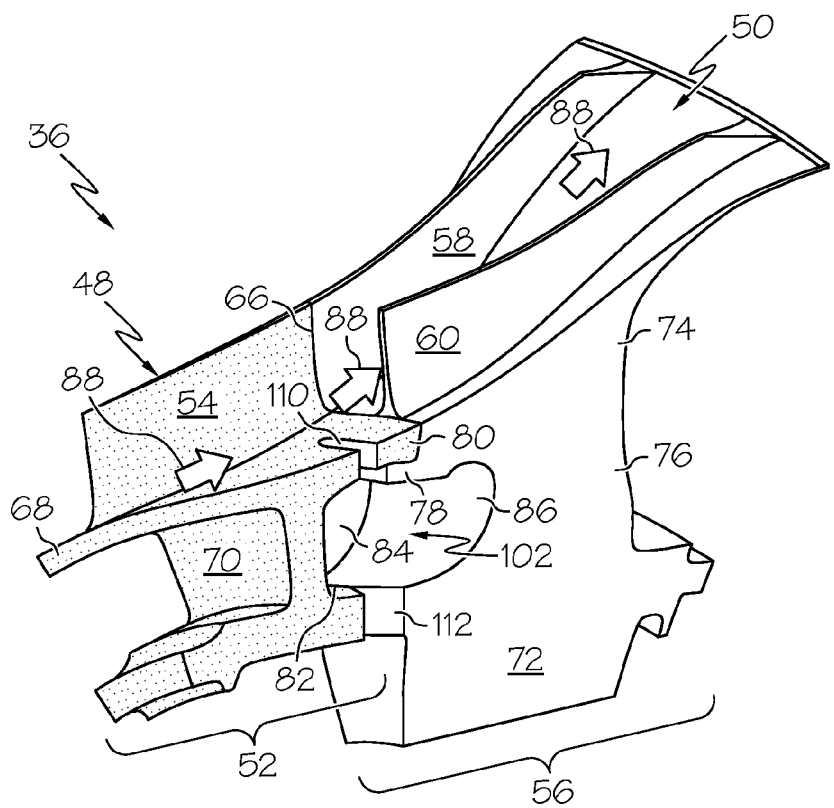

FIGS. 3 and 4 are side plan and isometric cross-sectional views, respectively, illustrating a portion of multi-piece centrifugal impeller 36 in greater detail. It can be seen in FIGS. 3 and 4 that inducer hub section 52 includes an inner annular region 66 (referred to herein as "forward rotor disc 66"), an outer annular region 68 from which forward blade segments 54 extend, and an annular connecting wall 70, which extends radially outward from forward rotor disc 66 to outer annular region 68 of inducer hub section 52. In a similar manner, exducer hub section 56 includes an inner annular region 72 (referred to herein as "aft rotor disc 72"), an outer annular region 74 from which aft blade segments 58 and truncated aft blades 60 extend, and an annular connecting wall 76, which extends radially outward from aft rotor disc 72 to outer annular region 74 of exducer hub section 56. In preferred embodiments, a radially-overlapping hub interface (e.g., an annular lap joint) is provided between inducer hub section 52 and exducer hub section 56 to radially pilot hub section 52 to hub section 56 when impeller 36 is assembled. In this regard, and as further shown in FIGS. 3 and 4, exducer hub section 56 may be fabricated to include an annular step or shelf 78, which extends outwardly from hub section 56 in an axial direction toward inducer piece 48. Annular shelf 78 is matingly engaged about its outer circumference by a trailing lip or rim 80 extending axially from outer annular region 68 of inducer hub section 52 toward exducer piece 50. In this manner, inducer hub section 52 positively registers to exducer hub section 56 to ensure proper radial alignment and, specifically, to ensure that hub sections 52 and 56 are substantially co-axial. As a result, the formation of discontinuities (e.g., steps) is avoided between the outer circumferential surfaces of hub sections 52 and 56 defining the hub flow paths and between the outer ridges or tips of forward and aft blade segments 54 and 58. Finally, as further shown in FIG. 4 at 82, the trailing radial face of forward rotor disc 66 may abut the leading radial face of aft rotor disc 68 to provide additional mechanical support.

Advantageously, the multi-piece construction of impeller 36 enables material to be strategically removed from the interior of inducer piece 48 and/or exducer piece 50 prior to impeller assembly to allow the creation of one or more cavities or voids within impeller 36 and thereby reduce overall impeller weight. For example, as indicated in FIGS. 3 and 4, material may be removed from the back or trailing face of inducer piece 48 to form a first annular cavity or groove 84 therein. Similarly, material may be removed from the front or leading face of exducer piece 50 to form a first annular cavity or groove 86 therein. When multi-piece centrifugal impeller 36 is assembled, the trailing face of inducer piece 48 is positioned adjacent the leading face of exducer piece 50, and grooves 84 and 86 cooperate to define an annular cavity 84, 86 within impeller 36. In the illustrated example, inner annular cavity 84, 86 is located between connecting walls 70 and 76, as taken in an axial direction Inner annular cavity 84, 86 is fully contained within impeller 36 and does not breach either connecting wall 70 or connecting wall 76; consequently, the provision of annular cavity 84, 86 has minimal impact on the overall structural integrity of impeller 36. In further embodiments, a plurality of discrete, circumferentially-spaced cavities can be formed within impeller 36 as opposed to a continuous annular cavity. Notably, the creation of an internal cavity or cavities within impeller 36 facilitates the formation the hub bleed air passages through hub 52, 56 of impeller 36, as described below.

During operation of GTE 18 (FIG. 1), HP turbine 44 (FIG. 1) and, to lesser extent, LP turbines 46 are exposed to highly elevated temperatures due to their relative proximity to the outlet of combustion chamber 42 and the combustive gasses exhausted thereby. To prevent overheating of HP turbine 44, LP turbines 46, and/or other temperature-critical components included within turbine section 26, GTE 18 is further equipped with a gas turbine engine cooling system 100 (identified in FIG. 3). In the illustrated exemplary embodiment, gas turbine engine (GTE) cooling system 100 diverts a portion of the compressed airflow from compressor section 22, and specifically from the mid-hub section of impeller hub 52, 56, to turbine section 26 to cool HP turbine 44 and LP turbines 46. GTE cooling system 100 may thus be properly referred to as a "turbine cooling system" in the illustrated exemplary embodiment. The more general phrase "gas turbine engine cooling system" or "GTE cooling system" is utilized herein, however, to emphasize that embodiments of cooling system 100 are capable of supplying cooling air to various other types of gas turbine engine components in addition to, or in lieu of, one or more air turbines. Such components may include, but are not limited to, other components included within turbine section 26 (e.g., turbine nozzles or bearing assemblies) and components included within other engine sections (e.g., in certain embodiments, the bleed air may be injected into combustor section 24 to cool the inner liner wall of combustion chamber 42).

Figure 5:
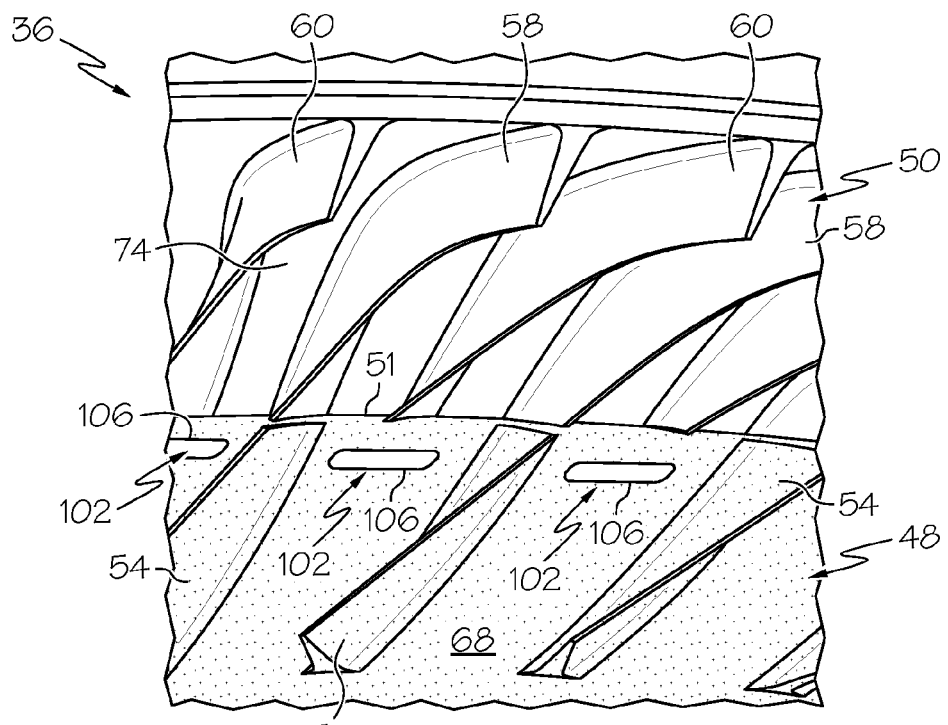
FIG. 5 is an isometric view of a portion of the exemplary multi-piece centrifugal impeller shown in FIGS. 3 and 4 more clearly showing the geometry and disposition of the inlets of the hub bleed air passages, as illustrated in accordance with an exemplary embodiment.

GTE cooling system 100 includes a plurality of hub bleed air passages 102 (one of which is shown in FIGS. 3 and 4) and at least one central bleed air conduit 104. As shown in FIGS. 3 and 4, bleed air passages 102 each extend radially through impeller hub 52, 56 to fluidly couple the external hub flow paths to the interior of impeller hub 52, 56 and, specifically, to central bleed air conduit 104. Each bleed air passage 102 includes an inlet 106 and an outlet 108, which are formed in the respective outer and inner circumferential surfaces of hub 52, 56. For reasons that will be explained more fully below, bleed air passages 102 are preferably formed through an intermediate or middle portion of impeller hub 52, 56; that is, the portion of impeller hub 52, 56 residing between the leading or forward portion of hub 52, 56 and the trailing or aft portion thereof, as taken along the rotational axis or centerline of impeller 36. To minimize the length of bleed air passages 102 and thereby maximize aerodynamic efficiency, each bleed air passages 102 preferably extends through impeller hub 52, 56 along a substantially linear path oriented in essentially a radial direction. Although only a single hub bleed air passage 102 is shown in FIGS. 3 and 5, it should be appreciated that hub bleed air passages 102 are circumferentially spaced about impeller 36 and extend radially inward from the outer surface of hub 52, 56 toward the rotational axis of impeller 36 in a spoke-like configuration. Bleed air inlets 106 are interspersed with impeller blades 54, 58 and may be angularly spaced around the rotational axis of impeller 36 at substantially regular intervals; however, this is by no means necessary.

Bleed air inlets 106 may assume any geometry suitable for directing air into bleed air passages 102, preferably in a manner that provides a gradual, uninterrupted aerodynamic transition from the external hub flow paths to maximize airflow velocity and cooling system efficiency. In the illustrated exemplary embodiment shown in FIG. 5, bleed air inlets 106 assume the form of elongated slots, which are formed in inducer piece 48 adjacent to split line 51 and which extend in essentially a tangential direction. It will be appreciated, however, that the shape, disposition, and orientation of inlets 106, and air passages 102 generally, may be varied to improve aerodynamic efficiency. For example, and temporarily referring to FIG. 6, inlets 106 may be formed in the outer circumferential surface of exducer piece 50 (inlet 106(b)) or, instead, formed in both the outer circumferential surface of inducer piece 48 and exducer piece 50 (inlet 106(c)). In certain implementations, bleed air inlets 106 may have a slot-like geometry, but may be oriented in essentially a longitudinal or axial direction (inlet 106(d)). In further embodiments, inlets 106 may have generally elliptical or circular shape (inlet 106(e)). In still further embodiments, inlets 106 may have a scalloped shape (not shown) to produce intermittent contact along split line 51 for structural alignment and damping.

Figure 6:
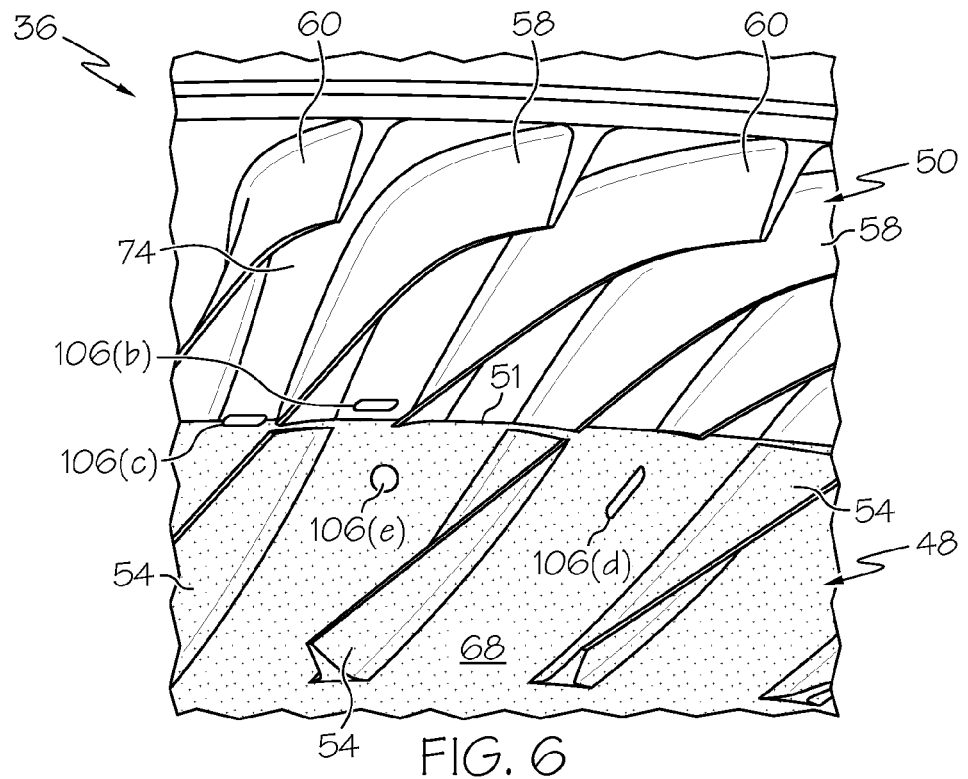
FIG. 6 is an isometric view of a portion of an exemplary multi-piece centrifugal impeller illustrating various alternative geometries and positionings for the inlets of the hub bleed air passages shown in FIGS. 3 and 4.
Figure 7:
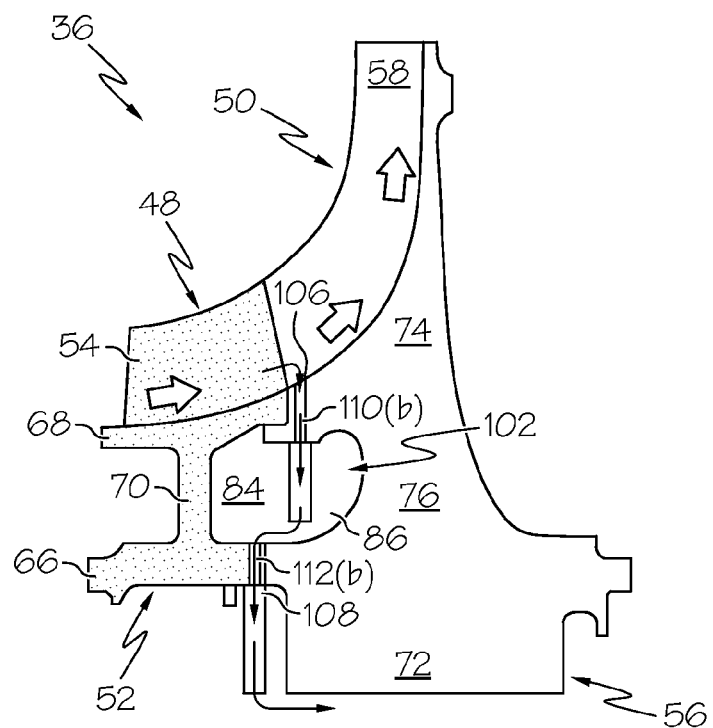
FIG. 7 is a side cross-sectional view of a portion of an exemplary multi-piece centrifugal impeller shown in FIG. 2 illustrating a hub bleed air passage formed through the impeller in accordance with a further exemplary embodiment.

The particular manner in which hub bleed air passages 102 are formed through hub 52, 56 of impeller 36 will vary amongst different inducer/exducer disk designs. In embodiments wherein impeller 36 is assembled from mating inducer and exducer pieces, each bleed air passages 102 is advantageously formed along the interface between inducer and exducer pieces. For example, as indicated in FIGS. 4-6, each hub bleed air passage 102 may include a first through-hole 110, which is formed through trailing lip or rim 80 of inducer hub section 52; and a second through-hole 112, which is formed through inner annular regions 66 and 72 of inducer hub section 52 and exducer hub section 72, respectively. Alternatively, and as indicated in FIG. 7, each hub bleed air passage 102 may include a first through-hole 110(b), which is formed through exducer piece 50 proximate annular shelf 78; and a second through-hole 112(b), which is formed through inner annular region 72 of exducer hub section 72. In either of these exemplary cases, each bleed air passage 102 is formed through inner cavity 84, 86; the first through-hole 110/110(b) is formed through an outer circumferential portion of impeller hub 52, 56 to fluidly couple the exterior hub flow paths to inner cavity 84, 86; and the second through-hole 112/112(b) is formed through an inner circumferential portion of impeller hub 52, 56 to fluidly couple inner cavity 84, 86 to the interior of hub 52, 56 and, thus, to central bleed air conduit 104 (described below). Through-holes 110 and 112 are conveniently formed within impeller hub 52, 56 prior to assembly of impeller 36 utilizing a known material removal process, such as electric discharge machining.

GTE cooling system 100 may be equipped with one or more internal airflow guidance structures to further improve aerodynamic efficiency. For example, as shown in FIG. 3, GTE cooling system 100 may include first and second vortex spoiler tubes 120 and 122. Vortex spoiler tube 120 may assume the form of a section of pipe or other tubular conduit that is disposed within annular cavity 84, 86, and fluidly coupled to the outlet of through-hole 110. Similarly, vortex spoiler tube 122 may assume the form of a section of pipe or other tubular conduit that is disposed within the larger central opening 62 of inducer hub section 56, and fluidly coupled to outlet 108 of through-hole 112. Vortex spoiler tubes 120 and 122 guide the bleed air flowing through impeller 36 to minimize secondary flow losses in annular cavity 84, 86 and thereby optimize cooling system efficiency. Vortex spoiler tubes 120 and 122 may also include internal ribs or vanes (not shown) to improve efficiency and to more closely match turbine cooling requirements. Vortex spoiler tubes 120 and 122 are advantageously produced as lightweight, self-supporting structures, which may be captured or retained between the inducer and exducer disks when impeller 36 is assembled. Vortex spoiler tubes 120 and 122 can be produced from titanium aluminide, carbon-carbon, and similar high temperature, lightweight materials.

During operation of GTE 18, a portion of the air flowing over the hub flow paths is diverted radially inward into the disk of impeller 36 by bleed air inlets 106, flows through passages 102, and is ultimately discharged from impeller 36 through bleed air outlets 108, as indicated in FIG. 3 by arrows 114. Central bleed air conduit 104 is fluidly coupled to outlets 108 and, during operation of GTE 18 (FIG. 1), conducts bleed air discharged by hub bleed air passages 102 to a section or sections of GTE 18 located downstream of impeller 36, as indicated in FIG. 3 by arrows 116. Central bleed air conduit 104 may assume any form suitable for conducting or directing the bleed air extracted from the impeller flow paths to one or more components downstream of impeller 36. In most cases, conduit 104 will assume the form of or at least include a longitudinally-extending channel or passage, which extends along an axis substantially parallel with the centerline of GTE 18 (FIG. 1) and to the longitudinal axis of the shaft to which impeller 36 is mounted. In the illustrated example, central bleed air conduit 104 extends alongside the spool or shaft (e.g., HP shaft 38) to which impeller 36 is mounted and is at least partially defined by a clearance (e.g., an annular gap or a longitudinally-extending channel) provided between outer circumferential surface of the shaft and the inner annular surface of hub 52, 56.

Figure 8:
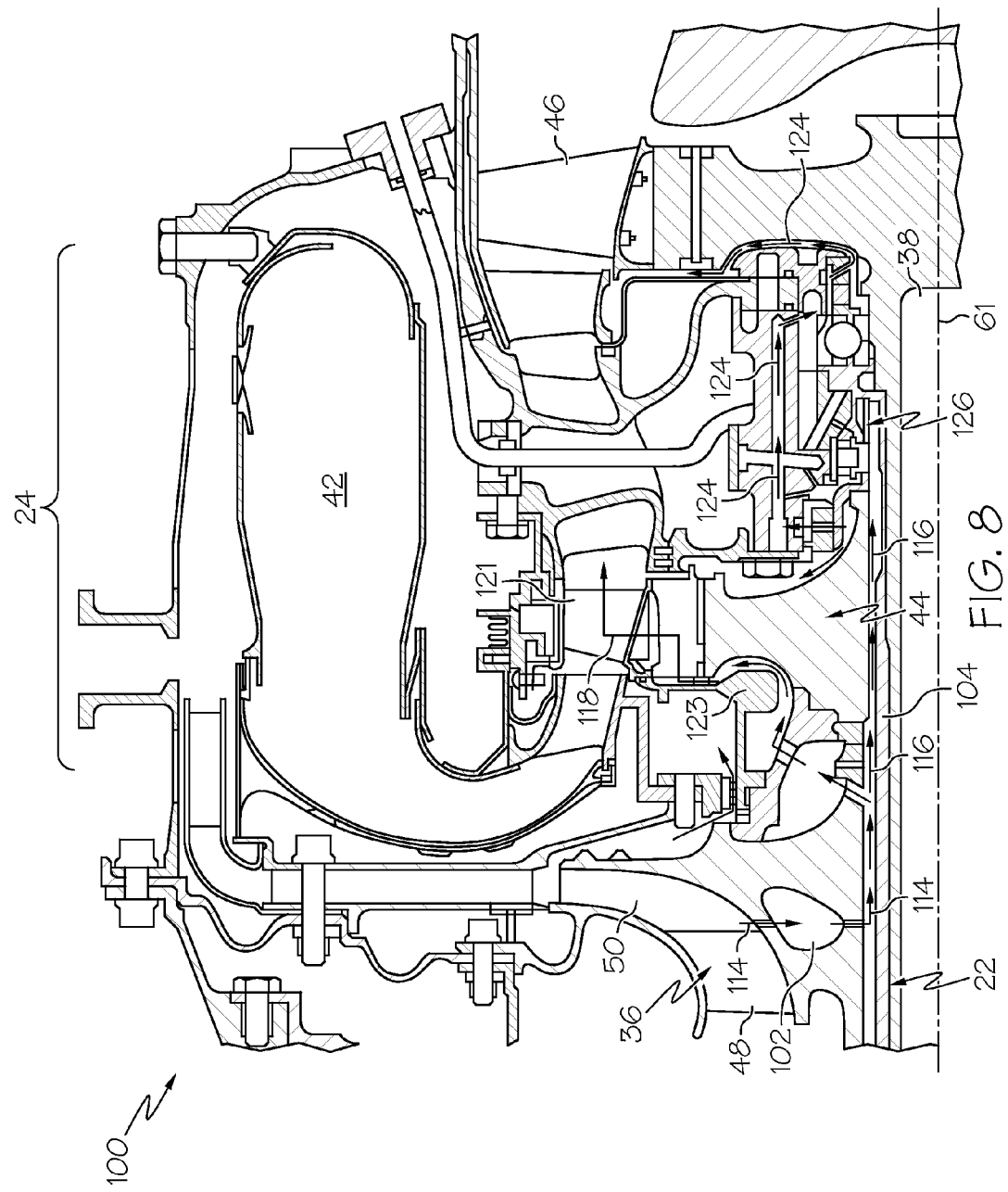
FIG. 8 is a cross-sectional view of a portion of the gas turbine engine shown in FIG. 1 and illustrating a number of exemplary flow paths along which the gas turbine engine cooling system may direct the cooling air bled from the impeller shown in FIGS. 1-5 to one or more components downstream of the impeller.

FIG. 8 is a cross-sectional view of a portion of GTE 18 (FIG. 1) illustrating a number of exemplary flow paths along which GTE cooling system 100 may direct the cooling air bled from the impeller hub flow paths. As was the case previously, arrows 114 represent the bleed airflow as it is drawn radially inward through impeller 36 and toward the centerline of GTE 18 (FIG. 1), and arrows 116 represent the bleed air as it flows in a generally longitudinal or aft direction within central bleed air conduit 104 and alongside HP shaft 38. As further indicated in FIG. 8 by arrows 118, a portion of the bleed air may be discharged from central bleed air conduit 104 immediately upstream of HP turbine 44, flow radially outward, and enter internal cooling channels provided within HP turbine 44 and extending through the rotating the turbine blades 121 (one of which is shown in FIG. 8). If desired, a turbine seal plate 123 or similar structural member may be affixed to HP turbine 44 to guide the cooling air discharged from cooling system 100 into the internal cooling passages of HP turbine 44. Finally, as further indicated in FIG. 8 by arrows 124, a portion of the cooling bleed air may also travel further within central bleed air conduit 104 in an aft direction and exit conduit 104 near a bearing assembly 126 supporting HP shaft 38 to provide cooling to bearing assembly 126 and to LP turbines 46 downstream thereof.

As previously stated, hub bleed air passages 102 are advantageously formed through an intermediate portion or midsection of impeller 36 such that bleed air inlets 106 are located closer to the impeller midline than to either the leading or trialing edge of impeller 36. In embodiments wherein impeller 36 is assembled from an inducer piece 48 and an exducer piece 50, hub bleed air passages 102 are preferably formed adjacent to the split line. By extracting airflow from a midportion of impeller 36 in this manner, it can be ensured that the temperature of the airflow is relatively low, which optimizes cooling efficiency and reduces flow rate requirements. At the same time, it can be ensured that the pressure of the impeller-bled air is sufficiently high to provide a desirable flow rate through the flow passages of GTE cooling system 100 thereby eliminating the need for TOBI devices. Furthermore, by directing the bleed air along a substantially straight flow path extending along central portion of the gas turbine engine, cooling circuit hardware requirements are reduced thereby minimizing the overall part count, weight, and complexity of cooling system 100. By bleeding air through a slot or other inlet located near the impeller split line (in the case of a multi-piece impeller), transient thermal gradient induced stresses are reduced by the cooling bleed airflow through the impeller, which helps heat and cool the heavy bore sections in a more efficient manner during start-up and acceleration/deceleration of the gas turbine engine.

While it is possible to extract air from the impeller section through orifices provided in a mid-section of the impeller shroud (e.g., shroud 40 shown in FIG. 1), the temperature of the airflow is significantly lower at the surface of the impeller hub; e.g., the temperature of the airflow extracted from the hub surface may be approximately 100° F. less than the temperature of the airflow extracted from a comparable shroud bleed location due to complex flow field losses at the shroud-line where leakage, shearing, and adverse passage secondary flow occur. In addition, during high speed rotation of impeller 36, centrifugal forces will tend to carry particulate debris, such as sand, entrained within the airflow in a radially outward direction and therefore away from the surface of the hub in much the same manner as does a cyclonic separation unit. Consequently, by bleeding airflow directly from the surface of the impeller hub, the amount of particulate debris ingested by the cooling system can be minimized and over system reliability can be increased.

It should be appreciated that here has been provided a gas turbine engine cooling system enabling the extraction of bleed air from an impeller at a location at which the temperature of the bleed air is relatively low, while the pressure of the bleed air is sufficiently high to satisfy the flow rate requirements of the cooling system. Embodiments of the above-described gas turbine engine cooling system significantly reduce cooling circuit requirements and eliminate the need for a TOBI device to decrease the overall part count, weight, and complexity of the cooling system as compared to conventional turbine cooling systems. Embodiments of the above-described gas turbine engine cooling system also provide an improved impeller thermal stress gradient response and improved overall system reliability by minimizing the amount of bleed air-entrained debris ingested by the cooling system.

The foregoing has also provide embodiments of a method for producing a gas turbine engine cooling system wherein a plurality of hub bleed air passages are formed in the intermediate portion of an impeller, which extend from an outer circumferential surface of the impeller to an inner circumferential surface thereof. The plurality of hub bleed air passages may be placed in fluid communication with a central bleed air conduit. In certain embodiment, the method further includes the step of assembling the impeller from an inducer piece and an exducer piece such that trailing radial face of the inducer piece residing adjacent the leading radial face of the exducer piece when the impeller is assembled, and the step of forming the hub bleed air passages through at least one of the trialing radial face of the inducer piece and the leading radial face of the exducer piece prior to assembling the impeller. Material may be removed from at least one of the trialing radial face of the inducer piece and the leading radial face of the exducer piece to create at least one internal cavity within the impeller when assembled through which the plurality of hub bleed air passages extends.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A gas turbine engine cooling system for deployment within a gas turbine engine, the gas turbine engine cooling system comprising:
   an impeller, comprising:
      an inducer piece;
      an exducer piece abutting the inducer piece; and
      a hub formed by the inducer piece and the exducer piece;
   a plurality of hub bleed air passages each having an inlet formed in an outer circumferential surface of the hub and an outlet formed in an inner circumferential surface of the hub, the plurality of hub bleed air passages formed in the impeller proximate the interface of the inducer piece and the exducer piece;
   a central bleed air conduit fluidly coupled to the outlets of the plurality of hub bleed air passages and configured to conduct bleed air discharged by the plurality of hub bleed air passages to a section of the gas turbine engine downstream of the impeller to provide cooling air thereto;
   at least one internal cavity created within the impeller when the inducer piece and exducer piece are assembled, the plurality of hub bleed air passages extending through the at least one internal cavity; and
   at least one vortex spoiler tube captured within the at least one internal cavity through which at least one of the hub bleed air passages included within the plurality of hub bleed air passages extends.

2. A gas turbine engine cooling system according to claim 1 wherein the inducer piece comprises a forward rotor disc through which the plurality of hub bleed flow passages extends.

3. A gas turbine engine cooling system according to claim 1 wherein the hub comprises:
   a leading portion;
   a trailing portion; and an intermediate portion between the leading portion and the trailing portion, the plurality of hub bleed air passages formed through the intermediate portion of the hub.

4. A gas turbine engine cooling system according to claim 3 wherein the plurality of hub bleed air passages are angularly spaced about the rotational axis of the impeller.

5. A gas turbine engine cooling system according to claim 3 wherein the plurality of hub bleed air passages are each oriented in essentially a radial direction.

6. A gas turbine engine cooling system according to claim 3 wherein the plurality of hub bleed air passages each extend along a substantially linear path from the outer circumferential surface of the hub to the inner circumferential surface of the hub.

7. A gas turbine engine cooling system according to claim 1 wherein the impeller comprises:
   a plurality of impeller blades projecting from the hub; and
   a plurality of hub flow paths generally defined by an outer circumferential surface of the hub and the plurality of impeller blades, the plurality of hub bleed air passages fluidly coupling the hub flow paths to the central bleed air conduit.

8. A gas turbine engine cooling system according to claim 3 wherein the hub comprises a central opening therethrough, and wherein the plurality of hub bleed air passages each comprise an outlet fluidly coupled to the central opening.

9. A gas turbine engine cooling system according to claim 8 further comprising a shaft to which the impeller is mounted, the shaft extending through at least a portion of the central opening and defining at least a portion of the central bleed air conduit.

10. A gas turbine engine cooling system according to claim 9 wherein the central bleed air conduit extends alongside the shaft.

11. A gas turbine engine cooling system according to claim 1 wherein the central bleed air conduit is substantially parallel with the longitudinal axis of the gas turbine engine.

12. A gas turbine engine cooling system according to claim 1 further comprising a turbine section downstream of the impeller, the central bleed air conduit having an outlet positioned to discharge bleed air into the turbine section to cool at least one component included therein.

13. A gas turbine engine cooling system according to claim 12 further comprising a combustor section fluidly coupled between the impeller and the turbine section, the central bleed air conduit extending through at least a portion of the combustor section.

14. A gas turbine engine cooling system comprising:
   an impeller, comprising:
      a hub;
      a plurality of impeller blades projecting from the hub; and
      a plurality of hub flow paths generally defined by an outer circumferential surface of the hub and the plurality of impeller blades;
   a central bleed air conduit having an inlet proximate the interior of the hub and having an outlet;
   a plurality of hub bleed air passages formed through an intermediate portion of the hub and fluidly coupling the hub flow paths to the central bleed air conduit, the plurality of hub bleed air passages conducting bleed air from the hub flow paths, through the hub, and to the central bleed air conduit to cool at least one component of the gas turbine engine during operation thereof; and
   a plurality of vortex spoiler tubes disposed within the hub and through which the plurality of hub bleed air passages extends.

15. A method for producing a gas turbine engine cooling system, comprising:
   assembling an impeller from an inducer piece and an exducer piece, the trailing radial face of the inducer piece residing adjacent the leading radial face of the exducer piece when the impeller is assembled;
   forming a plurality of hub bleed air passages in an intermediate portion of the impeller and extending from an outer circumferential surface of the impeller to an inner circumferential surface thereof; and
   disposing a plurality of vortex spoiler tubes within the impeller and through which the plurality of hub bleed air passages extends, the plurality of hub bleed air passages formed in at least one of the trialing radial face of the inducer piece and the leading radial face of the exducer piece prior to assembling the impeller.

16. A method according to claim 15 further comprising the step of placing the plurality of hub bleed air passages in fluid communication with a central bleed air conduit.

17. A gas turbine engine cooling system according to claim 1 wherein the plurality of hub bleed air passages comprises:
   a first plurality of through-holes formed through an outer circumferential portion of the hub; and
   a second plurality of through-holes formed through an inner circumferential portion of the hub;
   wherein the impeller further comprises an inner annular cavity contained within the hub, formed between the inducer piece and the exducer piece, and fluidly coupled between the first and second pluralities of through-holes.

* * * * *